United States Patent [19]

Whiteside

[11] Patent Number: 5,169,118
[45] Date of Patent: Dec. 8, 1992

[54] SENSOR-OPERATED BATTERY-POWERED FLUSH VALVE

[75] Inventor: John F. Whiteside, Franklin Park, Ill.

[73] Assignee: Sloan Valve Company, Franklin Park, Ill.

[21] Appl. No.: 833,753

[22] Filed: Feb. 11, 1992

[51] Int. Cl.⁵ .............................................. F16K 31/40
[52] U.S. Cl. .............................. 251/30.03; 251/129.04; 4/623; 4/DIG. 3
[58] Field of Search ............. 251/129.04, 30.03, 30.05; 4/623, DIG. 3

[56] References Cited

U.S. PATENT DOCUMENTS

| | | | |
|---|---|---|---|
| 3,974,879 | 8/1976 | Nelson, Jr. et al. | 251/129.04 X |
| 4,227,547 | 10/1980 | Cameron | 137/596.16 X |
| 4,793,588 | 12/1988 | Laverty, Jr. | 251/30.03 |
| 5,080,324 | 1/1992 | Chi | 251/129.04 |

Primary Examiner—Arnold Rosenthal
Attorney, Agent, or Firm—Kinzer, Plyer, Dorn, McEachran & Jambor

[57] ABSTRACT

A sensor-operated battery powered flush valve for a toilet device includes a valve body having a water inlet and a water outlet. A diaphragm valve movable within the valve body controls the flow of water between the inlet and the outlet. A latching solenoid is mounted within the valve body and controls movement of the diaphragm between open and closed positions. A battery is mounted to provide the power for the latching solenoid. An infrared sensor connects the battery to the latching solenoid to cause the solenoid to move the diaphragm to a valve open position. A magnetically-operated switch is positioned within the valve body and a magnet carried by the diaphragm will cause the switch to close when the diaphragm moves to a valve open position. Closure of the magnetic switch causes the solenoid to move to a position in which the diaphragm will close flow between the inlet and the outlet of the flush valve.

19 Claims, 1 Drawing Sheet

SENSOR-OPERATED BATTERY-POWERED FLUSH VALVE

THE FIELD OF THE INVENTION

The present invention relates to electrically operated flush valves for toilet devices such as toilets and urinals and particularly to a battery powered solenoid operated flush valve which operates in response to the detected presence of a user by an infrared detection system. Infrared operated flush valves are known in the art, but such devices are customarily operated on locally available electric power. The present invention is concerned with a battery powered infrared sensor operated flush valve utilizing a latching solenoid which limits the power drain on the battery supply.

DESCRIPTION OF THE PRIOR ART

U.S. Pat. No. 4,793,588 shows an electrically-powered flush valve using an infrared sensor in which the solenoid is operated upon the detected presence of a user of the toilet device. The solenoid will continue to be held in an operated position, permitting water to flow through the flush valve, for a predetermined timed period. At the end of the timing cycle, the solenoid will return to its unoperated position and the diaphragm of the flush valve functions to shut off flow between the valve inlet and outlet.

U.S. Pat. No. 4,309,781, owned by Sloan Valve Company, assignee of the present application, discloses an infrared operated automatic flushing system in which the presence of a user of the toilet device detected by the infrared sensor causes operation of the flush valve to start the flushing cycle. The flush valve is closed in the same manner as a manually-operated flush valve.

SUMMARY OF THE INVENTION

The present invention relates to electrically-operated flush valves for use on toilets and urinals and particularly to a battery operated flush valve.

A primary purpose of the invention is a sensor-operated battery powered flush valve of the type described.

Another purpose is to provide a battery-operated flush valve utilizing a latching solenoid to limit power drain on the battery.

Another purpose is a battery powered latching solenoid-operated flush valve in which an infrared sensor causes the latching solenoid to move to one position and in which the solenoid returns to a closed position in response to movement of the flush valve diaphragm.

Another purpose is an automatic flush valve as described utilizing a magnetic switch for returning the latching solenoid to the normally closed position and in which the magnet for operating the magnetic switch is carried by the flush valve diaphragm.

Another purpose is an electrically-operated flush valve module which may be retrofitted onto existing flush valves in the field.

Another purpose is an infrared sensor-operated battery powered flush valve having a low profile and a compact appearance.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

Figures 1, 3:
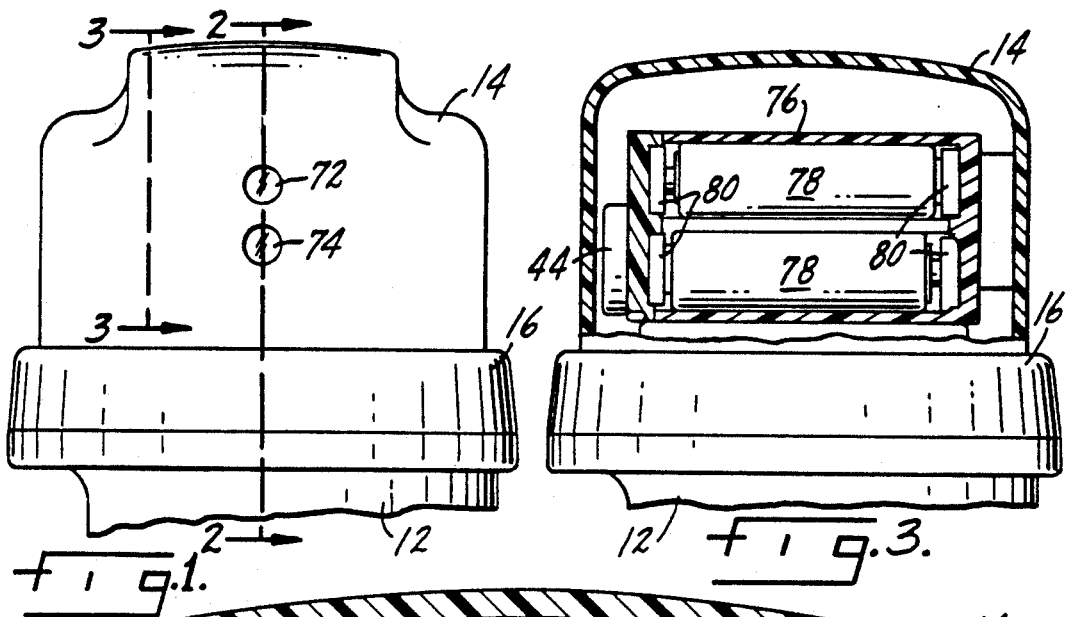
FIG. 1 is a side view of the flush valve disclosed herein.
FIG. 3 is a side view of the flush valve with portions of the outer housing removed.
Figure 2:
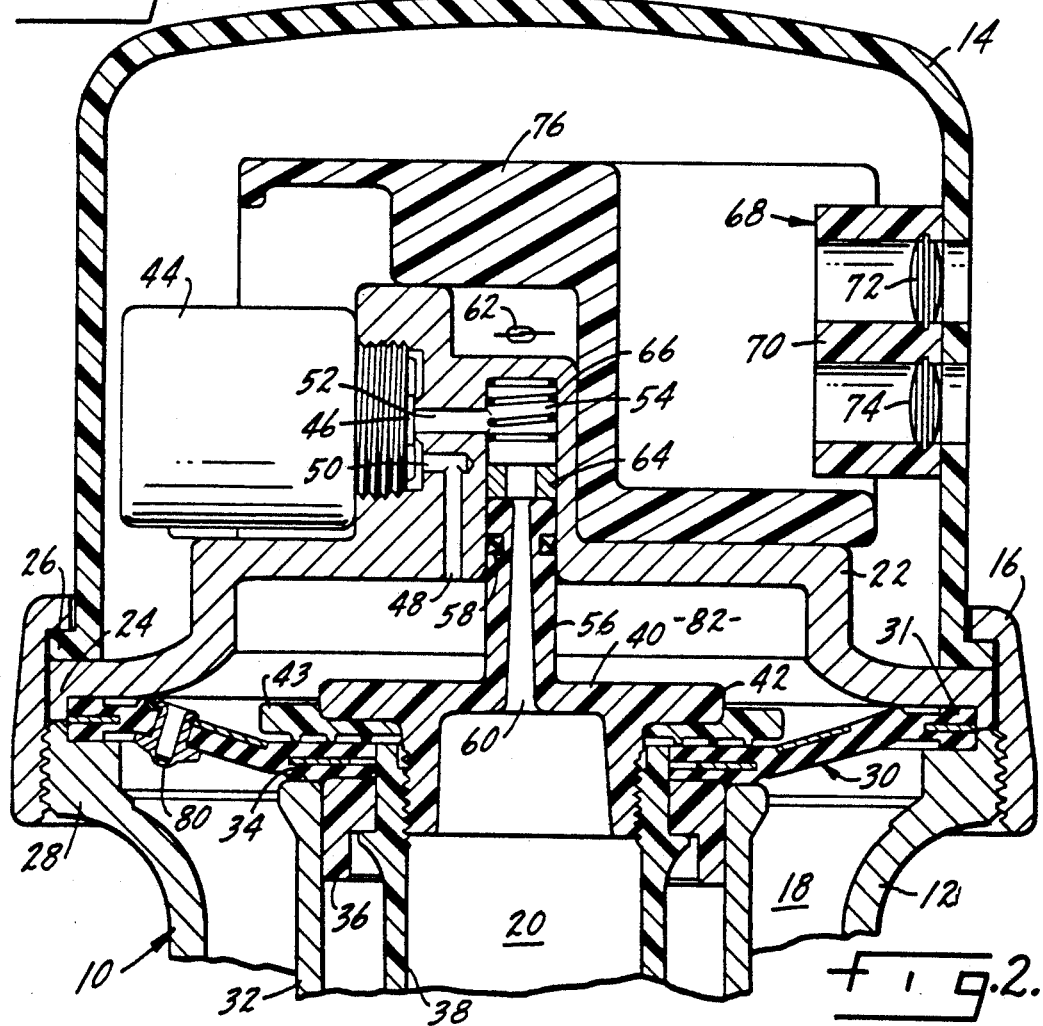
FIG. 2 is an enlarged section along plane 2—2 of FIG. 1.

The present invention will be described in connection with a flush valve of the type sold by Sloan Valve Company of Franklin Park, Ill., under the ROYAL trademark. This is a diaphragm-operated flush valve. The control components, including the latching solenoid, magnetically-operated switch and infrared sensor system are also applicable to other types of flush valves, for example a flush valve of the type sold by Sloan valve Company under the trademark CROWN, which is a piston operated flush valve.

In the drawings, the flush valve is indicated generally at 10 and may include a valve body 12 mounted to an exterior or outer cover 14 by a coupling ring 16. Body 12 has a water inlet which normally supplies water under pressure to the inlet area 18 of the flush valve and the outlet of the flush valve is connected to receive water from outlet chamber 20.

The flush valve as described herein may be considered as divided into two portions: one portion controlling the flow of water and the other portion housing the electrical components which are used to operate the flush valve. An inside cover 22 has an outwardly-extending flange 24 which is held between a lower flange 26 of outer cover 14 and a flange 28 of body 12. Cover 22 is effective to divide the flush valve into the two described portions.

A diaphragm indicated generally at 30, and which is customarily made of a flexible material such as rubber, has its outer extremity 31 held between the bottom of inside cover 22 and the top of flange 28 of body 12. The periphery of the diaphragm is fixed and the interior portions of the diaphragm are movable.

The body 12 includes a cylindrical throat 32 which terminates in a valve seat 34 upon which the diaphragm closes. The diaphragm assembly includes a refill ring 36, the exterior of which may have particular configurations to dampen valve closing movement and to reduce noise. The exterior of the refill ring fits generally closely adjacent the interior of throat 32. A guide 38 holds the refill ring 36 to the underside of the diaphragm and a piston disc 40 is threaded to the interior of the guide and has a laterally-extending flange 42 which overlies a seal 43 which is held against the upper side of the diaphragm by the piston disc. The refill ring, guide and seal 43 are all held to the diaphragm by the piston disc. Mounted on the upper side of inside cover 22 is a latching solenoid 44 which has a plunger 46 which moves axially in a direction generally perpendicular to the axis of movement of the diaphragm. Inside cover 22 has a water passage 48, one end 50 of which terminates opposite solenoid 44. Inside cover 22 has a second water passage 52 which faces plunger 46 and which is normally closed by the plunger, thus preventing any connection between passages 48 and 52. Passage 52 opens into a bore 54 in inside cover 22, which bore receives an upwardly-extending projection 56 of piston disc 40. Projection 56 carries a seal 58 which bears against the interior of bore 54 and prevents water leakage along the outside of the projection. Projection 56 has an interior passage 60 which opens into bore 54 above the projection and thus is in communication with passage 52.

A magnetic switch, for example a reed switch, is indicated at 62 and is positioned directly above inside cover 22 and in alignment with bore 54. A magnet 64 is positioned on the upper end of projection 56 and in alignment with the reed switch. The function of the magnet is to cause closure of the reed switch. A coil spring 66 is positioned within bore 54 and will insure that the magnet 64 moves away from the reed switch when valve closing movement of the diaphragm is initiated by reed switch closure. Although the described arrangement of a reed switch and a movable magnet is advantageous, other configurations whereby movement of the diaphragm cause closure of a switch are also within the scope of the invention. For example, the magnet may be stationary and a flux conducting metal component may move.

An infrared sensor system is indicated generally at 68 and includes a lens case 70 mounting a transmitting lens 72 and a receiving lens 74. The infrared sensor may be of the type shown in U.S. Pat. No. 4,309,781 and sold by Sloan Valve Company under the trademark OPTIMA. An infrared beam of light is transmitted through lens 72 and upon reflection by a user of the toilet device positioned within the path of the transmitted ray, there will be a reflection back through lens 74. Instead of using lenses positioned opposite openings in cover 14, the cover may be made transparent to infrared light. The electrical circuitry described in the above-mentioned patent will cause an operation of latching solenoid 44 to initiated flush valve operation. The disclosure of the infrared sensor in Pat. No. 4,309,781 is incorporated herein by reference.

A battery case is indicated at 76 and will be assembled about latching solenoid 44 and will be mounted on the upper side of cover 22. The battery case will mount a plurality of batteries, for example four, indicated at 78. There may be contact pads 80 which will interconnect the batteries. The batteries provide the power for the latching solenoid. A latching solenoid is particularly desirable in a battery-operated unit as the only time the power of the battery is utilized is when the solenoid is moved from one latching position to another. The only other drain on the power of the battery is from the infrared sensor which is normally a low current device. This is to be contrasted with solenoid-operated flush valves as shown in Pat. No. 4,793,588 in which the solenoid is held in an operated position by commercial power from the initiation of the flushing cycle to the end of a predetermined timed period. Such is an unacceptable use of power for a battery-operated device.

Prior to the time that a user is detected by the infrared system, water at inlet pressure within inlet chamber 18 will flow through bypass orifice 80 into the chamber 82 formed between the lower side of cover 22 and the upper surface of diaphragm 30. Water within chamber 82 will maintain the diaphragm in a normally closed position on seat 34, as the area responsive to pressure in chamber 82 is substantially larger than the area of upwardly-directed pressure from chamber 18. When the infrared system senses a user at the toilet device, an electric signal is supplied by the sensor in the manner described in the above-referenced U.S. Pat. No. 4,309,781, which causes the plunger 46 in solenoid 44 to move away from the end of passage 52. Water within chamber 82 will flow through passages 48 and 52 into bore 54 and down through passage 60 in piston disc 40. The sudden lowering of pressure in chamber 82 will cause the diaphragm to move upwardly, connecting inlet chamber 18 with outlet chamber 20. Water will flow about the exterior of guide 38 and inside of the cylindrical valve throat 32. As diaphragm 30 moves up, once it has reached a predetermined position relative to reed switch 62, the magnetic force of magnet 64 will cause the reed switch to close. This will again apply battery power to solenoid 44 which will move plunger 46 back to the closed position shown. The diaphragm will then begin its closing cycle. Water from the inlet will pass through bypass orifice 80 into chamber 82 and at such time as the pressure in chamber 82 is sufficient, the diaphragm will close upon its seat 34, ending the flushing cycle.

Of importance is the use of battery power for the flush valve which makes the initial flush valve installation substantially less expensive than one using electric power in which electric conduits must be brought to the flush valve location. Also, by using battery power it is possible to retrofit a manual flush valve in the field. Cover 22 and the electrical components mounted on may replace the existing exterior cover of the flush valve. A latching solenoid limits the power drain on the batteries and makes a battery-operated flush valve possible. By utilizing a switch to initiate the closing movement of the solenoid plunger, with the switch being operated by movement of the diaphragm, there will be a consistent amount of water supplied by the flushing operation and the amount of water supplied is not dependent on water pressure. In the flush valve of the above-mentioned '588 patent, closure of the flush valve is time dependent and thus the amount of water supplied is directly related to the available water pressure. In the present instance, as soon as the diaphragm has been forced upwardly by water pressure, the reed switch will close and the closing cycle of the flush valve will begin. Thus, there is a consistent volume of water supplied by the flushing device.

By utilizing a solenoid which has its plunger axis of movement perpendicular to the axis of movement of the diaphragm, rather than having the plunger directly on top and in alignment with the diaphragm, it is possible to have a flush valve profile which is substantially more compact than other devices currently available on the market.

Whereas the preferred form of the invention has been shown and described herein, it should be realized that there may be many modifications, substitutions and alterations thereto.

The embodiments of the invention in which an exclusive property or privilege is claimed are defined as follows:

1. A sensor-operated battery powered flush valve for a toilet device including a valve body having a water inlet and a water outlet, valve means within the valve body for controlling water flow between said inlet and said outlet, a latching solenoid mounted within said valve body and functioning to control operation of said valve means, battery means mounted within said valve body for connection to said solenoid to provide the electric power for operation thereof, sensing means positioned within the valve body for sensing the presence of a user of a toilet device, said sensing means functioning to connect the battery means to the solenoid to cause activation thereof to cause said valve means to connect said inlet and said outlet, and switch means within said valve body for connecting said battery means to said solenoid to cause activation thereof to cause said valve means to stop water flow between said inlet and outlet, said switch means being operated by movement of said valve means.

2. The flush valve of claim 1 further characterized in that said switch means is magnetically operated, and a magnet movable in said valve body with said valve means.

3. The flush valve of claim 2 further characterized in that said switch means is a reed switch.

4. The flush valve of claim 1 further characterized in that said sensing means includes an infrared transmitter and receiver.

5. The flush valve of claim 1 further characterized in that said valve means includes a diaphragm movable toward and away from a valve seat in said valve body.

6. The flush valve of claim 5 further characterized by and including magnetic switch means within said valve body for connecting said battery means to said solenoid to cause activation thereof to stop water flow from said inlet to said outlet, and a magnet movable with said diaphragm for causing operation of said magnetic switch.

7. A sensor-operated electrically powered flush valve for a toilet device including a valve body having a water inlet and a water outlet, valve means within the valve body for controlling water flow between said inlet and outlet, a solenoid mounted within said valve body and functioning to control operation of said valve means, sensing means positioned within the valve body for sensing the presence of a user of a toilet device, said sensing means functioning to connect electric power to said solenoid to cause activation thereof to cause said valve means to connect said inlet and outlet, and switch means within said valve body responsive to movement of said valve means to connect electric power to said solenoid to cause activation thereof to cause said valve means to stop water flow between said inlet and said outlet.

8. The flush valve of claim 7 further characterized by and including battery means for providing the electric power for operating said solenoid.

9. The flush valve of claim 7 further characterized in that said switch means is magnetically operated, and a magnet movable with said valve means for causing operation of said switch means.

10. The flush valve of claim 7 further characterized in that said sensing means includes an infrared transmitter and an infrared receiver.

11. The flush valve of claim 7 further characterized in that said valve means includes a diaphragm movable toward and away from a valve seat in said valve body to control flow between said inlet and said outlet.

12. The flush valve of claim 11 further characterized in that said switch means is magnetically operated, and a magnet movable by said diaphragm toward and away from said magnetically-operated switch means.

13. The flush valve of claim 11 further characterized by and including a mounting member in said valve body, a chamber between said mounting member and diaphragm, water pressure in said chamber maintaining said diaphragm closed upon said valve seat, a water passage connecting said chamber and said outlet, said solenoid controlling the flow of water through said passage.

14. The flush valve of claim 13 further characterized in that said solenoid includes a solenoid plunger, said solenoid plunger moving along an axis perpendicular to the axis of movement of said diaphragm.

15. The flush valve of claim 14 further characterized in that said solenoid is mounted on said mounting member, said water passage being within said mounting member.

16. The flush valve of claim 15 further characterized in that said switch means is a magnetically-operated switch positioned adjacent said mounting member, said diaphragm including a projection extending toward said mounting member, and a magnet mounted on said projection for movement with said diaphragm to cause closure of said magnetically-operated switch.

17. The flush valve of claim 13 further characterized by and including a bypass orifice in said diaphragm connecting said inlet and said chamber.

18. A sensor-operated battery powered flush valve for a toilet device including a valve body having a water inlet and a water outlet, valve means within the valve body for controlling water flow between said inlet and said outlet including a diaphragm movable toward and away from a valve seat in said valve body, a mounting member in said valve body, a chamber between said mounting member and diaphragm, water pressure in said chamber maintaining said diaphragm closed upon said valve seat, a water passage within said mounting member connecting said chamber and said outlet, a latching solenoid mounted on said mounting member and including a solenoid plunger, said solenoid plunger moving along an axis perpendicular to the axis of movement of said diaphragm to control the flow of water through said passage and thus the operation of said valve means, battery means mounted in said valve body on the opposite side of said mounting member from said diaphragm for connection to said solenoid to provide the electric power for operation thereof, sensing means positioned within the valve body, on the opposite side of said mounting member from said diaphragm for sensing the presence of a user of a toilet device, said sensing means functioning to connect the battery means to the solenoid to cause activation thereof to cause said solenoid plunger to move to permit water flow through said passage to permit movement of said diaphragm away from said valve seat to connect said inlet and said outlet, and means within said valve body for connecting said battery means to said solenoid to cause activation thereof to cause said solenoid plunger to close said passage whereby said diaphragm closes upon said valve seat to stop water flow between said inlet and outlet.

19. The flush valve of claim 18 further characterized by and including a piston disc attached to and movable with said diaphragm, a bore in said mounting member a projection on said piston disc extending upwardly into said bore, a passage in said projection in communication with said outlet and communicable with said mounting member passage through said bore.

* * * * *